(12) United States Patent
Angerhofer

(10) Patent No.: US 12,448,739 B2
(45) Date of Patent: Oct. 21, 2025

(54) ASPHALT MIXING PLANT

(71) Applicant: MOBA Mobile Automation AG, Limburg (DE)

(72) Inventor: Paul Angerhofer, Peachtree City, GA (US)

(73) Assignee: MOBA Mobile Automation AG, Limburg (DE)

( * ) Notice: Subject to any disclaimer, the term of this patent is extended or adjusted under 35 U.S.C. 154(b) by 906 days.

(21) Appl. No.: 17/509,824

(22) Filed: Oct. 25, 2021

(65) Prior Publication Data

US 2023/0131618 A1   Apr. 27, 2023

(51) Int. Cl.
| | |
|---|---|
| *E01C 19/00* | (2006.01) |
| *B28C 5/08* | (2006.01) |
| *B28C 5/20* | (2006.01) |
| *B28C 7/02* | (2006.01) |
| *E01C 19/10* | (2006.01) |
| *G01K 1/024* | (2021.01) |
| *G01J 5/00* | (2022.01) |

(52) U.S. Cl.
CPC ............ *E01C 19/10* (2013.01); *B28C 5/0806* (2013.01); *B28C 5/2072* (2013.01); *B28C 7/02* (2013.01); *G01K 1/024* (2013.01); *E01C 2019/1081* (2013.01); *G01J 5/0037* (2013.01)

(58) Field of Classification Search
CPC ......... E01C 19/1059; E01C 2019/1081; E01C 19/10; B28C 5/0806; G01J 5/0037; G01K 1/024
See application file for complete search history.

(56) References Cited

U.S. PATENT DOCUMENTS

2013/0343145 A1\*  12/2013  Villalobos Davila .......................
                                                          E01C 19/1004
                                                                   366/19
2020/0173857 A1\*   6/2020  Shelstad ................ G06V 20/56

FOREIGN PATENT DOCUMENTS

| EP | 2674530 A2 | 12/2013 |
|---|---|---|
| WO | 03061926 A1 | 7/2003 |

\* cited by examiner

*Primary Examiner* — Anshu Bhatia
(74) *Attorney, Agent, or Firm* — Perkins Coie LLP; Michael A. Glenn

(57) ABSTRACT

Asphalt mixing plant, comprising a mixing drum and a temperature monitoring system, the temperature monitoring system comprising a temperature sensor configured for contactless measurement of a material temperature of an asphalt mix to obtain at least a first temperature value for at least a first point of time, where the temperature sensor is arranged at an area of an output of the mixing drum or at a discharge chute of the mixing drum; and an operation and monitoring unit and a remote server; whereby the operation and monitoring unit is configured to wirelessly transmit the at least first temperature value to the remote server via a wireless communication interface unit.

17 Claims, 7 Drawing Sheets

Report — 500

Projekt Info — 510

| | |
|---|---|
| Report Date | 06/11/2021 |
| Operator | Dresden |
| Job | DD15 |
| CSJ | csj15 |
| Lot | lot15 |
| Mix Code | mix15 |
| Start | 06/11/2021 12:28:00 |
| End | 06/11/2021 14:03:34 |

Temperatures — 520

| Min | Target | Max |
|---|---|---|
| 275° F | 300° F | 325° F |

Summary — 530

Percentage of Temperatures within Range from Target Temperature

| +/- 10 | +/- 10-20 | +/- 20-30 |
|---|---|---|
| 99.4% | 0.6% | 0% |

Measured Temperatures — 540

| Min | Max | Avg | StdDev |
|---|---|---|---|
| 272.2° F | 316.1° F | 302 ° F | 3.25 |

Limits exceeded — 550

| Min | Max |
|---|---|
| 06/11/2021 12:52:13 | |

Fig. 6

ASPHALT MIXING PLANT

TECHNICAL FIELD

Embodiments of the present invention relate to a (mobile or portable and/or stationary) asphalt mixing plant, in particular to a temperature monitoring and recording system for asphalt mixing plants. Another embodiment refers to an asphalt mixing plant temperature monitoring and recording system and to a method for monitoring and/or operating an asphalt mixing plant.

BACKGROUND OF THE INVENTION

In asphalt mixing plants, asphalt mix is produced through a thermal mixing process of mineral rocks, filler, binding agent (mostly bitumen) and, if necessary, additives. The mixed asphalt can either be stored hot in a silo for a short time or filled directly into trucks. The finished mixture is used in various compositions for top and bottom layers of road pavement.

The increasing load on the roads under the strains of the steadily increasing traffic as well as the increased demands on the quality and durability of the road surfaces require constant further development of the road construction technology as well as an optimization of the processes and products that are used here. The focus of development interest is on the surface, binder and base layers of bituminous construction methods, which, for example, are severely affected by increasing traffic density, higher traffic loads and extreme temperatures.

In this context, the production of the road paving material in the mixing plant is already of paramount importance. In the manufacturing of Hot Mix Asphalt (HMA) and Warm Mix Asphalt (WMA), consistent temperatures at production per each mix design are a crucial factor in the quality of the mix.

Essentially, the performance benefits of having consistent mixing temperatures are:
  Reduce drying costs;
  Eliminate hot or cold load rejections;
  Improved consistence in production QC testing;
  Reduced thermal segregation;
  Improved consistence in roadway compaction;
  Improved ride quality; and
  Improved pavement life.

In the prior art there are some approaches for temperature measuring used in asphalt mixing plants known.

A well-known method for tracking and recording the temperature of the mix is a type of thermode as measuring probe, which is placed directly in the mixing flow of the mixing plant. The disadvantage here is a lag or a delay in the temperature recording since the measuring principle is very sluggish. A further disadvantage is that the measuring probe is very quickly contaminated by the mixed material and thus incorrect measurements can occur. Furthermore, the recording method is done on a paper recorder wheel.

The WO 03/061926 A1 describes an apparatus for thermally processing aggregate to fabricate asphalt concrete, with an infrared (IR) temperature sensor which detects the temperature of the heated aggregate.

It is an objective of the present invention to improve the temperature measurement and monitoring used for asphalt mixing plants.

An embodiment provides an asphalt mixing plant comprising a mixing drum and a temperature monitoring system. The temperature monitoring system comprises at least a temperature sensor and an operation and monitoring unit (e.g. having a display). The temperature monitoring system further comprises a wireless communication interface unit (in short: communication interface) configured to wirelessly connect the operation and monitoring unit with an (external) remote server. Temperature sensors are configured for performing contactless measurement of a material temperature of an asphalt mix to obtain at least a first temperature value for a first point of time. According to embodiments the temperature sensor can perform further contactless measurements to obtain a second or further temperature value for a second or further point of time. Here, the temperature sensor is arranged at an area of an output of the mixing drum. An example for this arrangement is the arrangement at a discharge chute of the mixing drum. The operation and monitoring unit is configured in the basic implementation to wirelessly transmit the first temperature value (for a first point of time) to the remote server via the wireless communication interface unit. In an enhanced implementation, the temperature monitoring system further comprises a mobile device, for example a laptop computer or a tablet PC or a smartphone or the like.

The mobile device is configured to wirelessly exchange temperature data and/or process data and/or project data with the operation and monitoring unit and/or the remote server.

In a further conceivable implementation, the temperature monitoring system comprises at least a temperature sensor, a mobile device as (external) operating and monitoring unit and (additionally) an (external) remote server. The temperature monitoring system further comprises a wireless communication interface unit (in short: communication interface) configured to wirelessly connect the temperature sensor with the mobile device and (additionally) with the remote server. The wireless communication interface unit is configured in this implementation to wirelessly transmit the first temperature value (for a first point of time) to the mobile device and/or to the remote server.

Embodiments of the present invention are based on the finding that one or more temperature sensors, e.g. IR temperature sensors arranged at the mixing drum discharge chute can be used to monitor and record asphalt temperature as it exists at the mixing drum prior to the conveyor to the silos. The system is enhanced by a communication interface, e.g. a wireless communication interface so that an external entity like a remote server and/or a mobile device can get access to the data gained by the use of the one or more temperature sensors. For example the server can belong to a plant control center for the purpose of production entries. This concept has the advantage, that the temperature values can be monitored and/or displayed in real time. Thus, the obvious benefit of embodiments of the invention are real time temperatures without a delay and the ability to display and record on a computer inside the mixing plant. Further benefits are the ability to send the data to the cloud.

According to embodiments, the communication interface may be (an integrated) part of the local operation and monitoring unit of the asphalt plant or a control unit of the asphalt plant. It may, for example, use WiFi, 3G, LTE, or 5G to transfer the data to an external entity, like the external remote server and/or the mobile device.

According to embodiments the temperature sensor is directed to an asphalt mix outputted by the mixing drum or the discharge chute of the mixing drum. Measurement at this location provides the opportunity to discharge mix not meeting requirements or specification prior to being loaded to the silos.

According to embodiments, the temperature monitoring system further comprising a signal converter and/or analog to digital converter configured to convert the signal from the temperature sensor into a digital signal from the first temperature value.

According to further embodiments, the temperature sensor and/or the signal converter is arranged under the mixing drum.

According to further embodiments the data, e.g. as sent to the cloud can be analyzed with processing software e.g. remotely. Thus, according to embodiments, the operation and monitoring unit/display and/or the mobile device and/or the remote server comprises a comparator (software) configured to compare the first temperature value and/or further temperature values with an expected range for the first temperature values and/or with upper and/or lower temperature limits and/or with a target temperature value; alternatively or additionally the operation and monitoring unit/display and/or the mobile device and/or remote server may be configured to output information on a deviation from an expected range for the temperature values, on a deviation from a target temperature value or an exceeding of upper and/or lower temperature limits. Consequently, a notification of under min or over max temperature readings is possible. Furthermore this IT structure enables to perform recordings and evaluating of temperature data and transmission of data to cloud services. According to further embodiments out of the data, a report can also be created for review and analysis by the client and/or contractor, for example a road construction company or state institution, recording and evaluating of temperature data and transmission of data to cloud services.

According to a further embodiment the operation and monitoring unit and/or the mobile device comprises a display.

According to a further embodiment the operation and monitoring unit or the mobile device is configured to output a report; for example, the report may comprise the target temperature, the maximum deviation of the target temperature, the minimum and maximum temperature and/or a percentage of time/material flow within a target range or out of the target range.

According to further embodiments the report may comprise a diagram illustrating the temperature of the material over the time, i.e. the temperature values assigned to the material flow. For example, this diagram may comprise a target range of the temperature, e.g. the target temperature +/−5%, so that it can be directly extracted which portion of the material flow/which measurement values are out of the range. According to further embodiments such a diagram may be used for the monitoring. Here it is advantageous, that the diagram can be analyzed in real time, so that at the external operation center measurements can be initiated.

According to further embodiments a second temperature value for a second point of time or a plurality of temperature values for a plurality of points of time can be measured by use of the temperature sensor. According to embodiments the plurality of temperature values over the time are assignable to a material flow. Consequently, a continuous monitoring of the temperature values can be used. According to further embodiments an evaluation over the time can be performed. For example, the operation and monitoring unit/display or the mobile device is configured to determine a percentage of time/material flow exceeding upper and/or lower temperature limits and/or deviating from an expected temperature range and/or deviating from a target temperature.

As discussed above, not only the monitoring is enabled by the operation and monitoring unit or the remote server or the mobile device, but also a recording. For example, a simple report can be output or alternatively all temperature values can be stored/recorded in a memory. Therefore, an embodiment provides an operation and monitoring unit comprising a memory unit of being connected to a memory which is configured for recording the first temperature value and further temperature values.

According to a further embodiment, the temperature monitoring system further comprising an additional temperature sensor configured to contactless measurement of a material temperature of an asphalt mix to obtain an additional temperature value.

Embodiments of the present invention may be used in all types of (mobile or portable and/or stationary) mixing plants, for example in so-called drum plants or batch plants. Batch plants make small accurate batches of asphalt mixture through a process that is repeated over and over until the total tonnage for a project has been manufactured. Drum plants, on the other hand, prepare the asphalt mix through a continuous process and require the use of silos for temporary storage prior to the mix being trucked to the paving location.

Storage silos, necessary for the continuous production of a drum plant, used in batch plants to increase production rates and throughput, and must be insulated and sometimes heated to prevent temperature loss.

Another embodiment provides a temperature monitoring system comprising a temperature sensor configured for contactless measurement of a material temperature of an asphalt mix to obtain at least a first temperature value for at least a first point of time, where the temperature sensor is arranged at an area of an output of the mixing drum or at a discharge chute of the mixing drum; and an operation and monitoring unit/display, and a communication interface and a remote server. The operation and monitoring unit/display is configured to wirelessly transmit the at least first temperature value to the remote server via the communication interface. According to a further embodiment, the temperature monitoring system further comprising a mobile device. The mobile device is configured to wirelessly exchange temperature data and/or process data and/or project data with the operation and monitoring unit and/or the remote server.

Another embodiment provides a method for monitoring and/or operating an asphalt mixing plant, the method comprises the steps of contactless measuring a material temperature of an asphalt mix by use of a temperature sensor to obtain at least a first temperature value for at least a first point of time, where the temperature sensor is arranged at an area of an output of the mixing drum or at a discharge chute of the mixing drum; and wirelessly transmitting the at least first temperature value to the remote server via a communication interface. According to a further embodiment, the method for monitoring and/or operating an asphalt mixing plant further comprising a mobile device. The mobile device is configured to wirelessly exchange temperature data and/or process data and/or project data with the operation and monitoring unit and/or the remote server.

According to further embodiments the method may be computer implemented.

According to further embodiments, the temperature monitoring system comprises at least a temperature sensor and an external operation and monitoring unit (e.g. having a display). The wireless communication interface unit (in short: communication interface) is configured to wirelessly connect the temperature sensor and the (external) operation and monitoring unit. The concept may be implemented by a method/computer implemented method.

Further variance according to embodiments are disclosed in the claims.

BRIEF DESCRIPTION OF THE DRAWINGS

Embodiments of the present invention will be subsequently discussed referring to the enclosed figures, wherein:

FIG. 6 shows schematically an example of a report generated out of the project and measured during data.

DETAILED DESCRIPTION OF EMBODIMENTS

Below an asphalt mixing plant 100 will be discussed in detail. Here optional elements are mentioned, wherein a basic asphalt plant 100 comprises at least a mixing drum 120.

Figure 1:
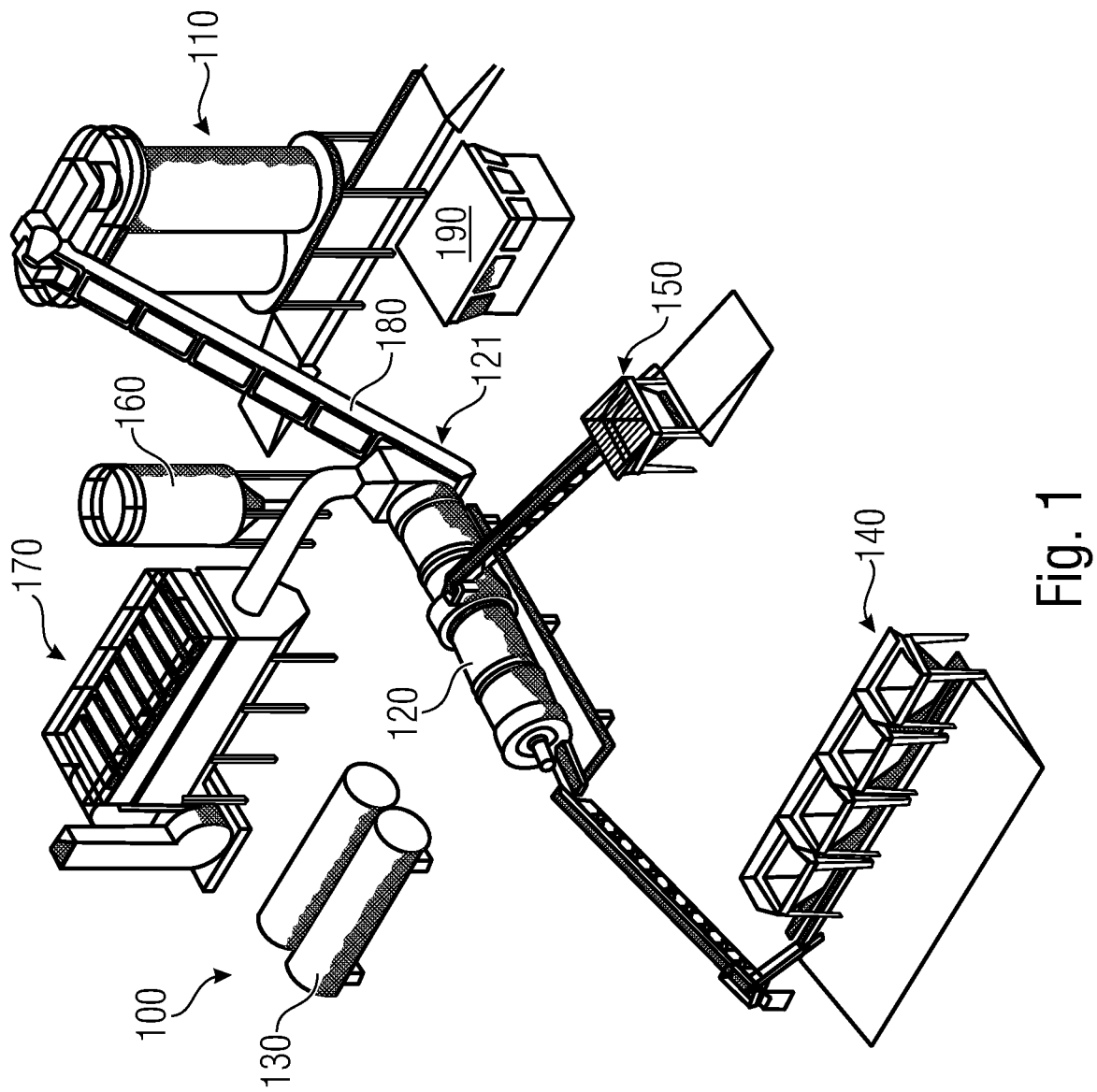
FIG. 1 shows a schematic overview of an asphalt mixing plant.

In FIG. 1, an example of the main structure of an asphalt mixing plant 100 (drum plant) is shown. The asphalt mixing plant 100 is mainly composed of a mixing drum 120, several cold aggregate bins 140, a RAP (Recycled Asphalt Product/Reclaimed Asphalt Pavement) bin 150, bitumen supply tanks 130, a fines and additive silo 160 containing mineral filler or fines from the baghouse or special additives, a baghouse dust collector 170 for removing dust and other light particulate matter produced by operation of the mixing drum 120, a slat conveyor 180 to transport finished asphalt mix 50 to a storage silo 110, and a control center 190 to manage operations of the plant from a central location.

Referring to FIG. 1, asphalt mix 50 is in general produced as follows: Aggregates like sand, stone and other elements are temporarily stored at the cold aggregate bins 140 and are released onto a conveyor in specific amounts. The aggregate mix is then conveyed to the mixing drum 120 where the mix is heated and bitumen and the other components (recycled material RAP and fines and additives) are added according to the mixture to be produced. For heating all contents of the mixing drum 120 to an elevated temperature, the mixing drum 120 is equipped with a burner. The finished asphalt mix 50 is stored in one or more silos 110 before it is filled into trucks and transferred to paving site. If any problems within the asphalt mix production process or within the asphalt mixing plant 100 occur, corrective action can be taken by an operator who is in the control center 190.

It is beneficial, that the temperature readings are transmitted in real time, so that the monitoring can be performed in real time. A further benefit is, that the temperature values can be directly transmitted to an operation center or to the customer. Due to this the operation center can be locally separated from the asphalt mixing plant. Below, with respect to FIG. 2a a basic and an enhanced variant will be discussed.

Figure 2A:
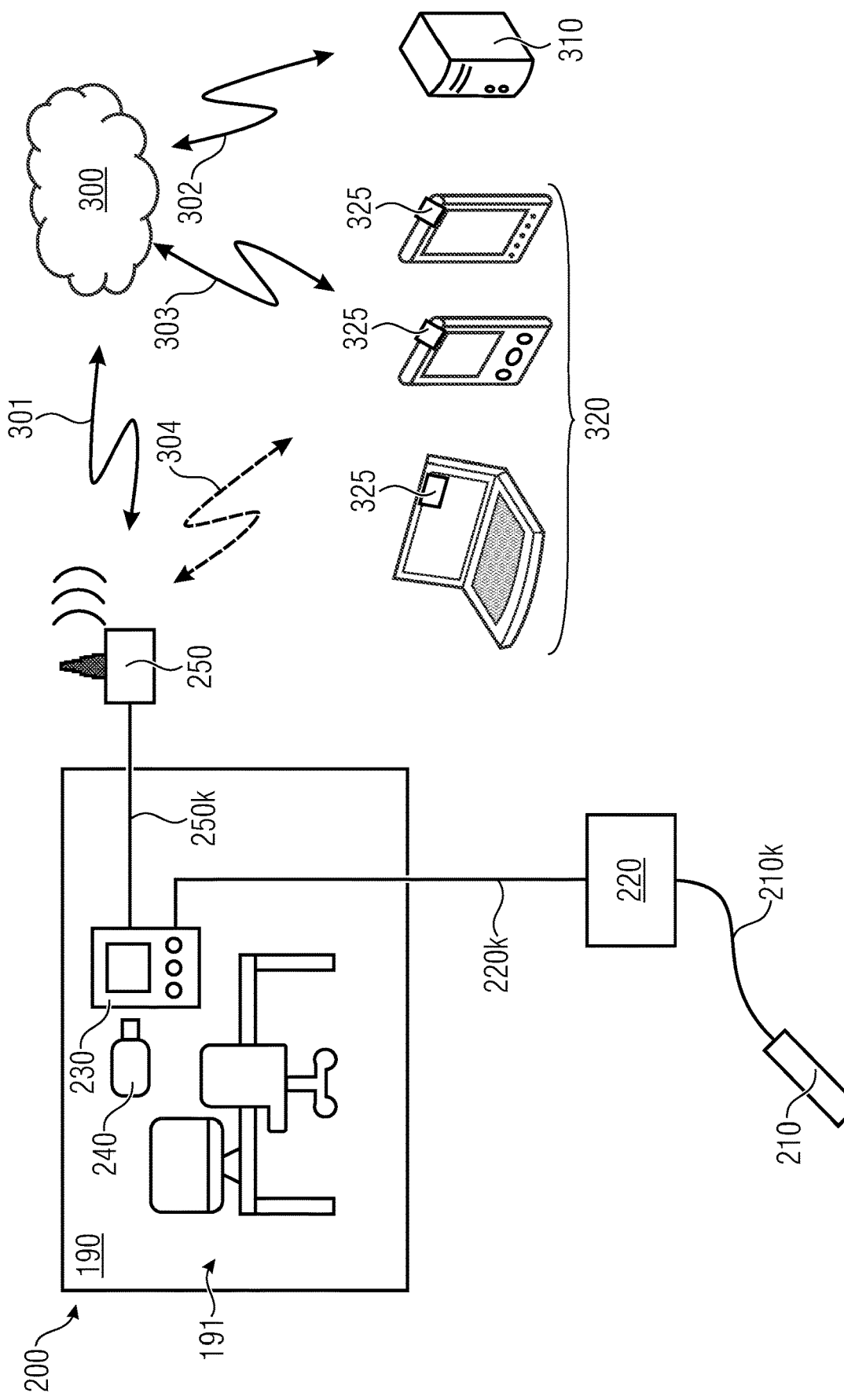
FIG. 2a shows a schematic overview of the plant temperature monitoring and recording system according to a basic and an enhanced implementation.

According to the invention, FIG. 2a shows an overview of a plant temperature monitoring and recording system 200 with which the temperature of the finished asphalt mix 50 can be measured, monitored, recorded and evaluated. The plant temperature monitoring and recording system 200 is mainly composed of a contactless temperature sensor 210 like an infrared temperature sensor, a signal converter 220, an operating and monitoring unit (control and display device) 230, a wireless communication interface unit 250 and an (optional) memory unit 240 like a USB memory stick.

The temperature sensor 210 is electrically connected to the signal converter 220 via a cable connection 210k, whereby the signal converter adapting the signals from the temperature sensor 210, i.e. converting them, for example, into digital signals. The signal converter 220 is connected via a cable connection 220k to the operating and monitoring unit 230, for instance via a CAN fieldbus system or other kind of known network or known fieldbus system. Further sensors can also be connected to the signal converter 220, for example a further contactless temperature sensor 211 (see FIG. 3), which is connected to the signal converter 220 via a cable connection 211k.

The operating and monitoring unit 230 serves as a so-called human-machine interface (HMI or MMI) and is preferably located within the control center 190 at the operator's workplace 191, so that the operator has the measured temperature values constantly in view. In other words, the operating and monitoring unit 230 located in position for easy visual reference. In the event of problems, for example too high temperatures or too low temperatures of the finished asphalt mix 50, the plant operator can react immediately.

Measured and/or evaluated data can be stored on the memory stick 240 as a data backup or for later evaluation (post-processing), but it is a central point of the invention to store the data on a remote data server 310 or to transfer it to a mobile device 320, which can be, for example, a laptop computer or a tablet PC or a smartphone or the like. The mobile device 320 has a communication unit 325 to communicate via corresponding wireless connection types such as WLAN, Bluetooth, 3G, LTE, or 5G etc. The operating and monitoring unit 230 is connected via a cable connection 250k to a wireless communication interface unit 250. Via the wireless communication interface unit 250, the operating and monitoring unit 230 can wirelessly exchange data with the remote data server system 310 and/or the mobile device 320 over a network 300 via communication links 301, 302 and 303, that is to say to wirelessly transmitting data to said devices 310 and 320 and receiving data wirelessly from these devices 310 and 320. Furthermore, a direct wireless communication between the wireless communication interface unit 250 and the mobile device 320 is possible via a communication link 304. The operating and monitoring unit 230 can read in, process and output data, for example read in sensor data, evaluate these data and output sensor and/or evaluated data to the plant operator, to the memory stick 240, to the remote data server system 310 and/or to the mobile device 320. The operating and monitoring unit 230 is like a central processing unit of the plant temperature monitoring and recording system 200 and comprises at least a microcontroller and one or more memory units (RAM, ROM, Flash . . . ). The operating and monitoring unit 230 comprises input elements such as buttons and keys, and also at least one output element, for example a display. The operating and monitoring unit 230 forms the interface between the operator and the plant temperature monitoring and recording system 200.

Figure 2B:
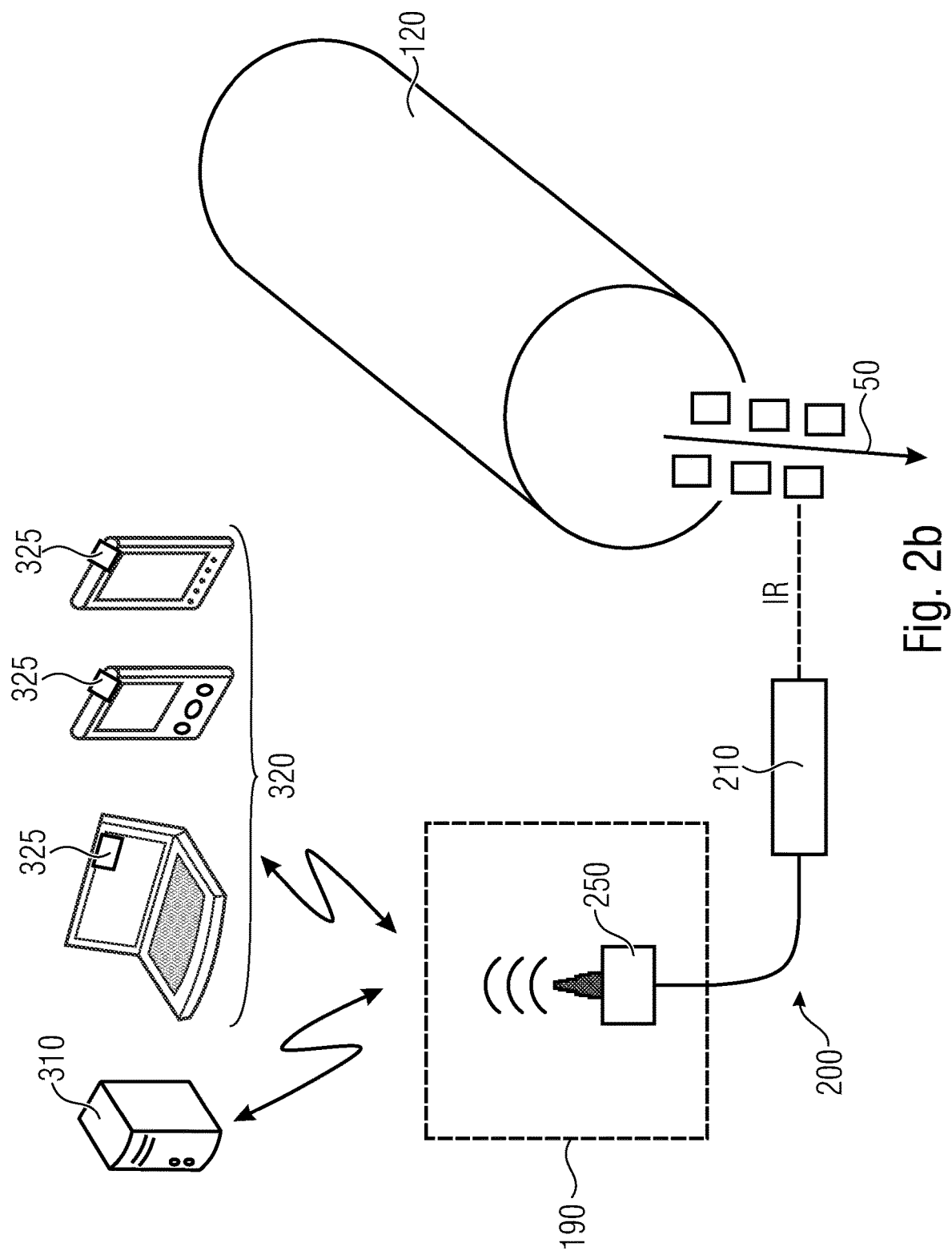
FIG. 2b shows a schematic overview of the plant temperature monitoring and recording system according to a further conceivable implementation.

A further conceivable implementation of a conceptual temperature monitoring and recording system 200 is shown by FIG. 2b. The temperature monitoring system 200 is according to the implementation attached to a mixing drum 120.

The temperature monitoring system 200 comprises at least a temperature sensor 210 which is arranged, such that the asphalt mix of the drum 120, e.g. at the discharge chute or the output of the mixing drum 120 can be monitored with regard to its temperature. The temperature sensor 210 is configured to contactlessly measure the temperature of the asphalt mix 50, e.g. the asphalt mix 50 which is outputted. This can be, for example, done by use of an infrared (IR) sensor, this sensor signal is then further processed (transmitted) to a mobile device 320 and/or to a remote server 310 via a wireless communication interface unit 250, said wireless communication interface unit 250 can be located for example within the entity 190, also referred to as control center.

The wireless communication interface unit 250 comprises a wireless transceiver, e.g. a WIFI transceiver, and is configured to transmit the one or more temperature values measured by use of the sensor 210 to an external entity, e.g. an external operation unit (mobile device) 320 (comprising a human machine interface and/or display, for example) or to an external remote server/cloud server 310. By use of the operation unit (mobile device) 320 and/or cloud server 310 the temperature data, e.g. the first temperature value or the first temperature value (for a first point of tome) in combination with further temperature values (for subsequent point of times) can be processed. For example the first and further temperature values belong to subsequent point of times, so that an average can be calculated and a deviation from the average or a deviation from a target temperature can be determined and indicated. This enable to improve the monitoring of the temperature values. Furthermore, it is possible that the recording of the temperature values can be done.

In this further conceivable implementation, the wireless communication interface unit 250 is like a central processing unit of the plant temperature monitoring and recording system 200 and comprises at least a microcontroller and one or more memory units (RAM, ROM, Flash . . . ).

Figure 3:
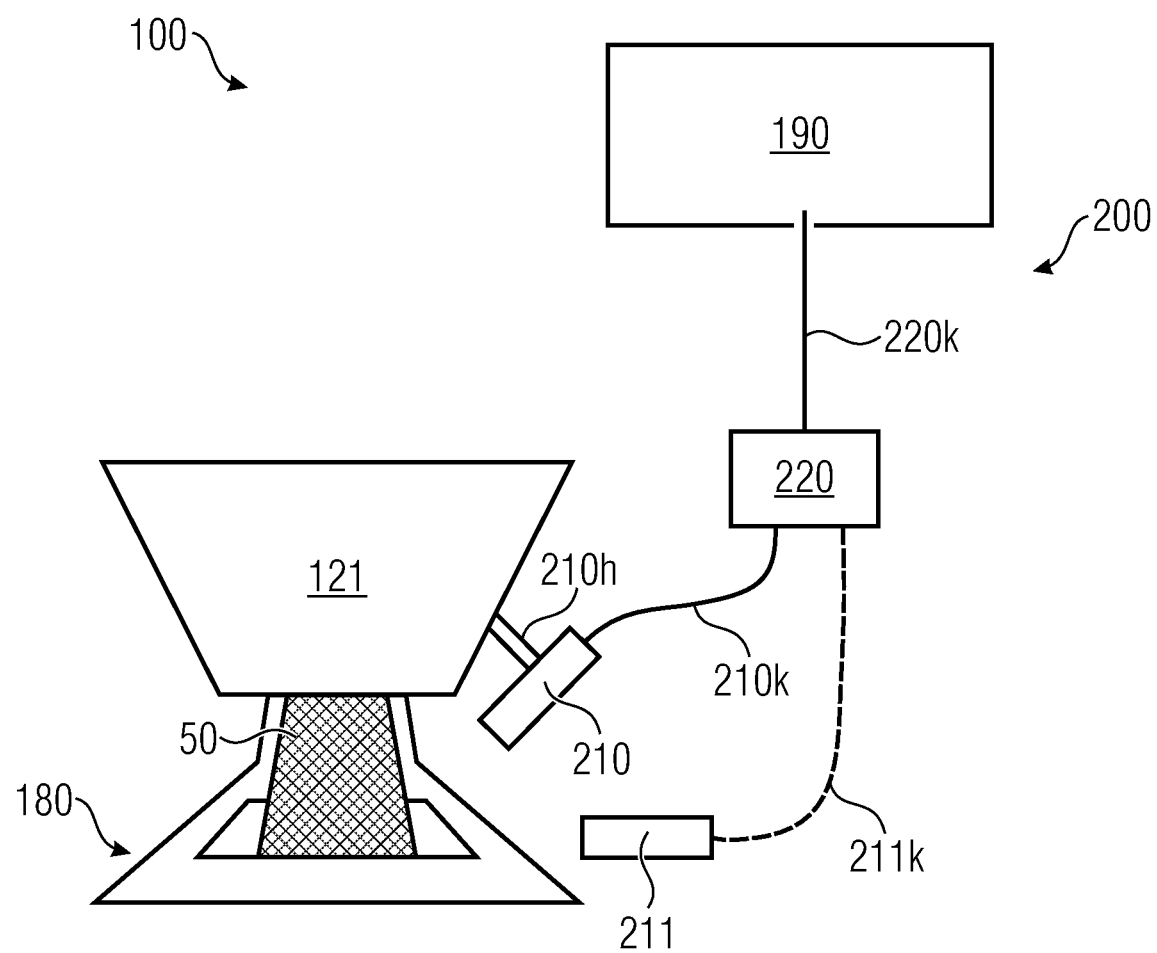
FIG. 3 shows schematically the position of the IR temperature sensor output of the mixing drum, discharge chute (according to embodiments)

Referring to FIG. 3, the position of the contactless (infrared) temperature sensor 210 is shown and described in more detail. To measure and monitor the temperature of the finished asphalt mix 50, it is advantageously to measure this directly at the point where the ready-mixed material 50 leaves the mixing drum 120 and falls onto the conveyor belt of the slat conveyor 180 which transports the material 50 into the silo 110. In this respect, the temperature sensor 210 is advantageously arranged in the area of the output of the mixing drum 120 or at the discharge chute 121 by means of a holder 210h. The temperature sensor 210 thus records the temperature of the material 50 coming out of the mixing drum 120. In other words, the temperature sensor 210 catches curtain of material 50 along with material pile. As described above, a further contactless temperature sensor 211 can be connected to the signal converter 220 via a cable connection 211k. The availability and the accuracy of the temperature measurement can thus be further improved since the temperature of the material 50 at different points of the outflow can be recorded. The one or more temperature sensors 210,211 and the signal converter 220 are preferably mounted under the mixing drum 120 to be isolated from environment and maintenance activities.

Figure 4:
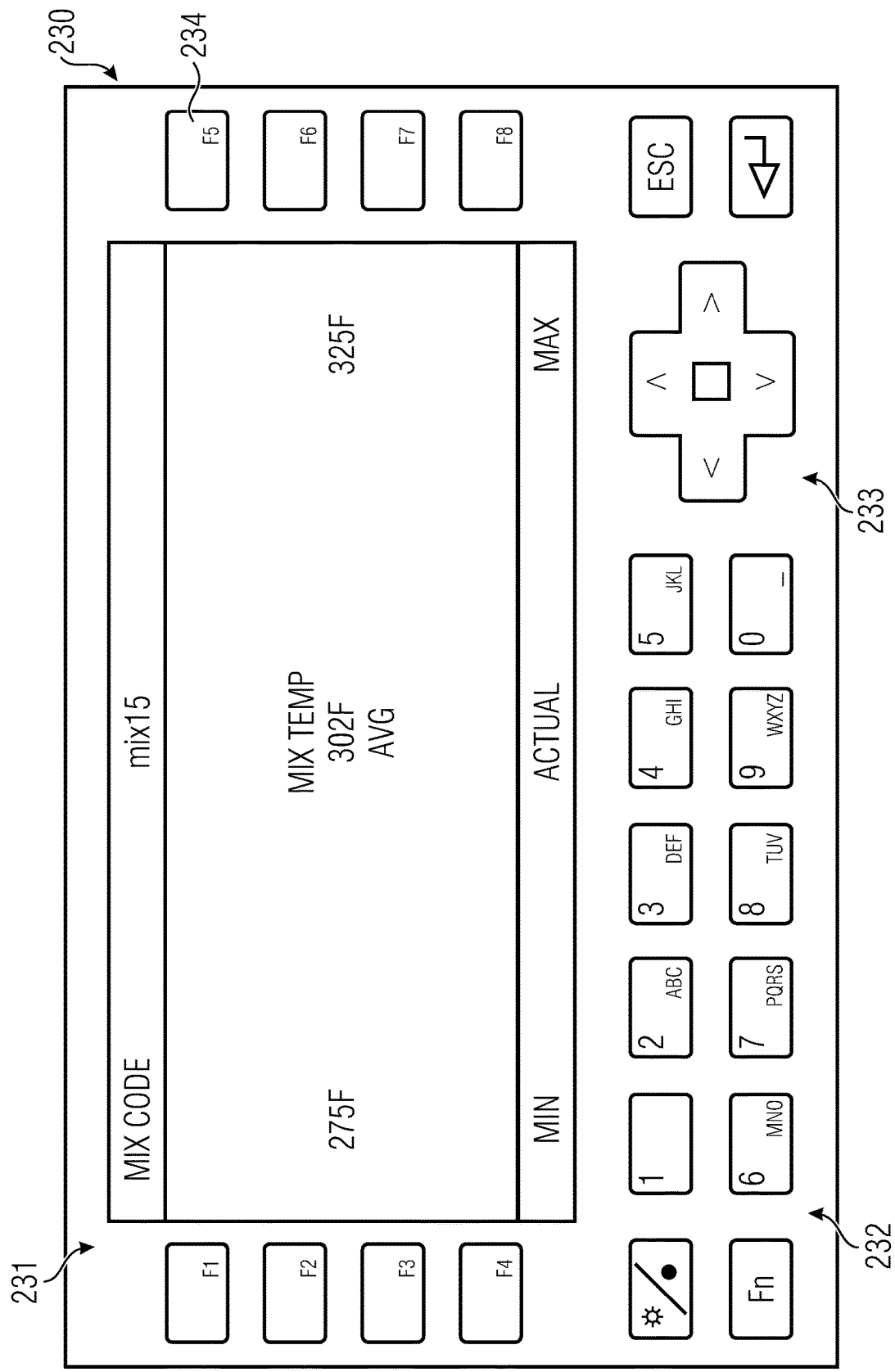
FIG. 4 shows schematically an example of representing project average temperature data during the mixing processes according to further embodiments.

In FIG. 4, an example of a representation of project and temperature data on the display 231 of the operating and monitoring unit 230 is shown. Project data can, for example, be called up and displayed from a project database which is stored on a remotely arranged data server 310 (as described above). Other data, such as target temperature and temperature limit values, etc., can also be called up via this cloud-based method. This data is assigned to an already defined asphalt mixture, for example, or are set for each project in advance by the customer or contractual partner, for example a road construction company, state institutions or the government. The data can either be changeable or are fixed specifications and can therefore no longer be changed.

In the upper area of the display screen 231, the current project is named "mix15", as shown in the example. In the middle of the display screen 231, real time temperature information or temperature information averaged over time can for example be displayed. As shown in FIG. 4, temperature information of the mixture temperature averaged over time is currently displayed, such as "302° F." in the example. To the left and right of the temperature information of the mixture temperature, the upper and lower temperature limits are shown, such as "275° F." and "325° F." in the example. If a realtime temperature value or the temperature information averaged over time exceeds one of the limit values, the background of the display screen 231 turns red, for example, to give the system operator a direct indication. It is conceivable to output the indication that the temperature of the mixed material 50 exceeds one of the defined limit values also to a mobile device 320, for example to a mobile device 320 of the truck driver transporting asphalt material to a paving site or a supervisor of the road construction company. Because such a problem affects for example the progress of the construction work on site.

As already mentioned, some data regarding the project or the temperature values represented on the display screen 231 of the operating and monitoring unit 230 or the mobile device 320 can be changed by the operator on site, some data not. If a change of data is possible, this can be done for example with the keys 232,233 and/or the function keys 234 on the keypad of the operating and monitoring unit 230. If the operating and monitoring unit 230 has a touch display, the individual fields to be changed can be touched and edited directly with the finger. The changes are preferably saved in the database on the data server 310 using communication components and ways described above.

Figure 5:
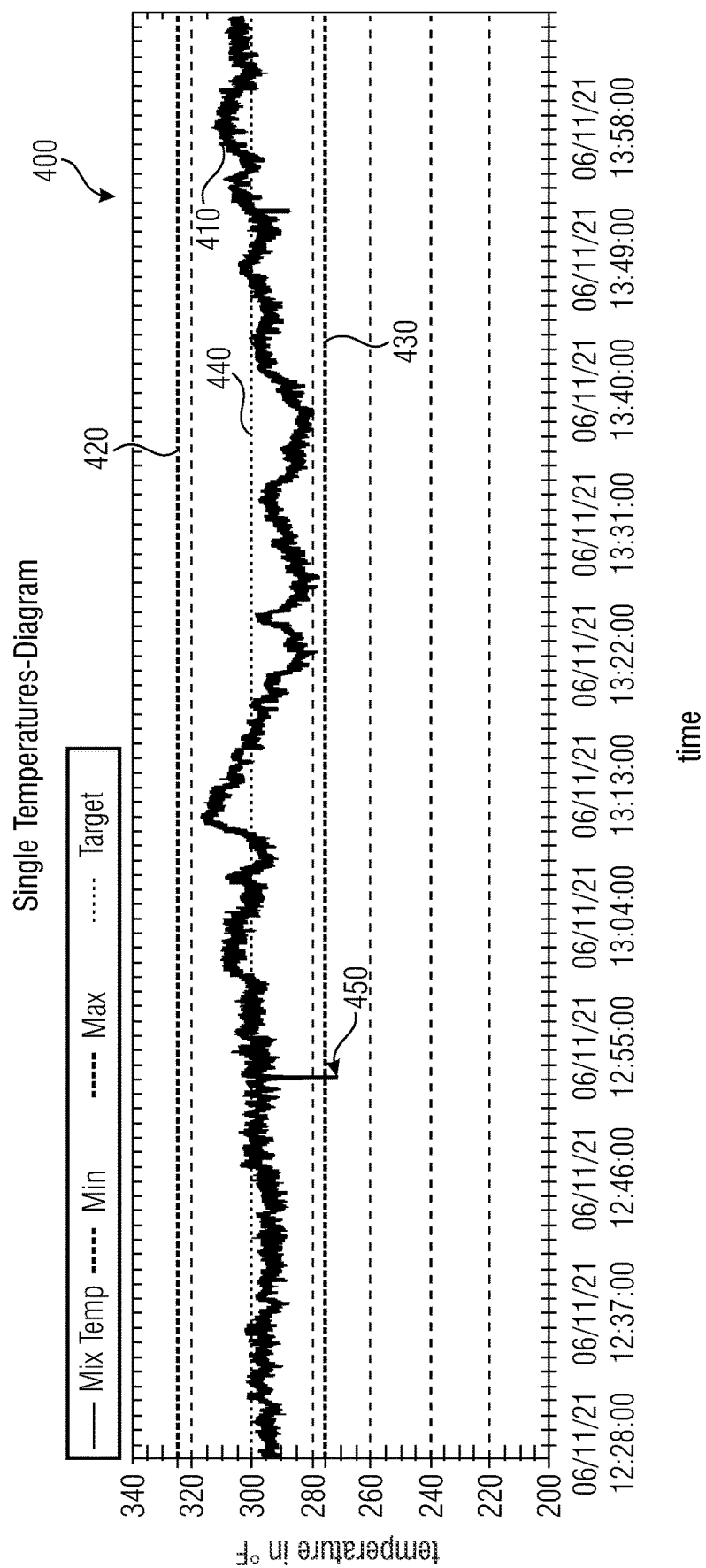
FIG. 5 shows an example of a temperature diagram recorded during the mixing process.

FIG. 5 shows as an example a temperature diagram 400 recorded throughout the mixing process. In the diagram, the upper limit value 420, the lower limit value 430 and the target temperature value 440 are shown as a highlighted line. The curve of the continuously measured temperature values 410 is shown between the upper and lower limit values. At point 450 there is a point at which the measured temperature value has fallen below the permitted limit value. There was probably a brief interruption in the manufacturing process, so that either no or very little material 50 fell out of the mixing drum 120 onto the conveyor belt 180. This can have various causes, such as a problem with the feed of cold aggregates for example. The data for this post-processing analysis was taken from the project file, which is stored on the memory unit 240 or on the data server system 310. This follow-up analysis enables the operator of the mixing plant to prove that the entire mixing process worked without significant errors and that the material produced meets the requirements.

For documentation purposes, a corresponding report 500 can be countered from the measured data and the data stored in the project file on the data server 310, as shown in FIG. 6. The report 500 can preferably be divided into different areas 510 to 550. General project information is given in area 510, such as mixing plant information, job number, mix code number, start and end of the measurement etc. Information on the upper limit temperature value 420, the lower limit temperature value 430 and the target temperature value 440 are given in the area 520. The following areas 530, 540 and 550 of the report 500 contain a summary of the evaluated data, i.e. that these data were determined from the measured and recorded temperature values. On the one hand, the percentage of temperature values within the range of the target temperature is given for different ranges. The maximum and minimum measured temperature values as well as the calculated average value over time are also given. If the lower and/or the upper limit value has been exceeded or fallen below, this is indicated in the report 500. The report 500 also enables the operator of the mixing plant 100 to prove that the entire mixing process worked without errors and that the material produced meets the requirements. The report 500 is usually used for documentation purposes and can also be stored on the memory unit 240 and/or on the data server system 310.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer or a mobile device.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

LIST OF REFERENCE NUMERALS

50 Asphalt mix
100 Asphalt mixing plant
110 Storage silo
120 Mixing drum
121 Mixing drum output/Mixing drum discharge chute
130 Bitumen supply tanks
140 Cold aggregate bins
150 RAP bin
160 Fines and additive silo
170 Baghouse dust collector
180 Slat conveyor
190 Control center
191 Workplace plant operator
200 Plant temperature monitoring and recording system
210, 211 Contactless temperature sensor (Infrared)
210h Holder/Bracket
220 Signal converter
220k Cable connection
230 Operating and monitoring unit
231 Display area
210k, 211k Cable connection
232 Keys/Buttons/Keyboard 233 Up/Down and Left/Right buttons
234 Function keys
240 Memory unit
250 Communication unit
250k Cable connection
300 Network
301, 302, 303, 304 Communication links
310 Data server system
320 Mobile device (laptop computer, smartphone or any other kind of mobile or portable device)
325 Communication unit
400 Temperature diagram
410 Temperature profile
420 Upper temperature value limit
430 Lower temperature value limit
440 Target temperature value
450 Measuring point of the lowest measured temperature
500 Report
510 . . . 550 Report areas

The invention claimed is:

1. Asphalt mixing plant (100), comprising a mixing drum (120) and a temperature monitoring system (200), the temperature monitoring system (200) comprising:
a temperature sensor (210) configured for contactless measurement of a material temperature of an asphalt mix (50) to obtain at least a first temperature value for at least a first point of time, where the temperature sensor (210) is arranged at an area of an output of the mixing drum (120) or at a discharge chute (121) of the mixing drum (120); where the temperature sensor is directed to the ready-mixed material outputted by the mixing drum or the discharge chute of the mixing drum; and
an operation and monitoring unit (230) and a remote server (310); whereby
the operation and monitoring unit (230) is configured to wirelessly transmit the at least first temperature value to the remote server (310) via a wireless communication interface unit (250).

2. Asphalt mixing plant (100) according to claim 1, wherein the temperature monitoring system (200) further comprising a mobile device (320,325) to wirelessly exchange temperature data and/or process data and/or project data with the operation and monitoring unit (230) and/or the remote server (310).

3. Asphalt mixing plant (100) according to claim 1, wherein the temperature sensor (210) is directed to an asphalt mix (50) outputted by the mixing drum (120) or the discharge chute (121) of the mixing drum (120).

4. Asphalt mixing plant (100) according to claim 1, wherein the temperature monitoring system (200) further comprising a signal converter (220) and/or analog to digital converter (220) configured to convert the signal from the temperature sensor (210) into a digital signal from the first temperature value.

5. Asphalt mixing plant (100) according to claim 1, wherein the temperature sensor (210) and/or a signal converter (220) is arranged under the mixing drum (120).

6. Asphalt mixing plant (100) according to claim 1, wherein the temperature monitoring system (200) further comprising an additional temperature sensor (211) configured to contactless measure a material temperature of an asphalt mix (50) to obtain an additional temperature value.

7. Asphalt mixing plant according to claim 1, wherein the operation and monitoring unit and/or a mobile device and or the remote server comprises a comparator configured to compare the first temperature value and/or further temperature values with an expected range for the first temperature value and/or with the upper and/or lower temperature limits and/or with a target temperature value; and/or wherein the operation and monitoring unit and/or the mobile device and/or remote server is configured to output information on a deviation from an unexpected range for the temperature values, from a target temperature value or an exceeding of upper and/or lower temperature limits.

8. Asphalt mixing plant (100) according to claim 1, wherein the temperature sensor is configured to determine a second temperature value for a second point of time; and/or wherein the temperature sensor (210) is configured to determine a plurality of temperature values over the time.

9. Asphalt mixing plant (100) according to claim 1, wherein the temperature sensor (210) is configured to determine a plurality of temperature values over the time and wherein the plurality of temperature values are assigned to a material flow of the asphalt mix (50).

10. Asphalt mixing plant (100) according to claim 1, wherein the operation and monitoring unit (230) and/or a mobile device (320, 325) is configured to determine a percentage of time/material flow exceeding upper and/or lower temperature limits and/or deviating from an expected temperature range and/or deviating from a target temperature.

11. Asphalt mixing plant (100) according to claim 1, wherein the operation and monitoring unit (230) comprises a memory unit (240) always connected to a memory to record the first temperature value and/or further temperature values.

12. Temperature monitoring system (200) for an asphalt mixing plant, comprising:
a temperature sensor (210) configured for contactless measurement of a material temperature of an asphalt mix (50) to obtain at least a first temperature value for at least a first point of time, where the temperature sensor (210) is arranged at an area of an output of a mixing drum (120) of the asphalt plant (100) or at a discharge chute (121) of the mixing drum (120) of the asphalt mixing plant (100); and
an operation and monitoring unit (230) and a remote server (310); whereby the operation and monitoring unit (230) is configured to wirelessly transmit the at least first temperature value to the remote server (310) via a wireless communication interface unit (250).

13. Temperature monitoring system (200) according to claim 12, wherein the temperature monitoring system (200) further comprising a mobile device (320,325) to wirelessly exchange temperature data and/or process data and/or project data with the operation and monitoring unit (230) and/or the remote server (310).

14. Asphalt mixing plant (100), comprising a mixing drum (120) and a temperature monitoring system (200), the temperature monitoring system (200) comprising:
a temperature sensor (210) configured for contactless measurement of a material temperature of an asphalt mix (50) to obtain at least a first temperature value for at least a first point of time, where the temperature sensor (210) is arranged at an area of an output of the mixing drum (120) or at a discharge chute (121) of the mixing drum (120); where the temperature sensor is directed to the ready-mixed material outputted by the mixing drum or the discharge chute of the mixing drum; and
an operation and monitoring unit (230); whereby the operation and monitoring unit (230) is configured to wirelessly receive the at least first temperature value from a wireless communication interface unit (250) of the temperature sensor (210).

15. Method for monitoring and/or operating an asphalt mixing plant (100), the method comprises the steps of:

contactless measuring a material temperature of an asphalt mix (50) by use of a temperature sensor (210) to obtain at least a first temperature value for at least a first point of time, where the temperature sensor (210) is arranged at an area of an output of the mixing drum (120) or at a discharge chute (121) of the mixing drum (120); and wirelessly transmitting the at least first temperature value to the remote server (310) via a wireless communication interface unit (250).

16. Method according to claim 15, further comprising wirelessly exchanging temperature data and/or process data and/or project data with the operation and monitoring unit (230) and/or the remote server (310).

17. Computer program for performing, when running on the computer method according to claim 15.

\* \* \* \* \*